Sheet 1, 2 Sheets.
F. A. Calvert.
Wool & Cotton Picker.
No. 59. Reissued Dec. 27, 1843.
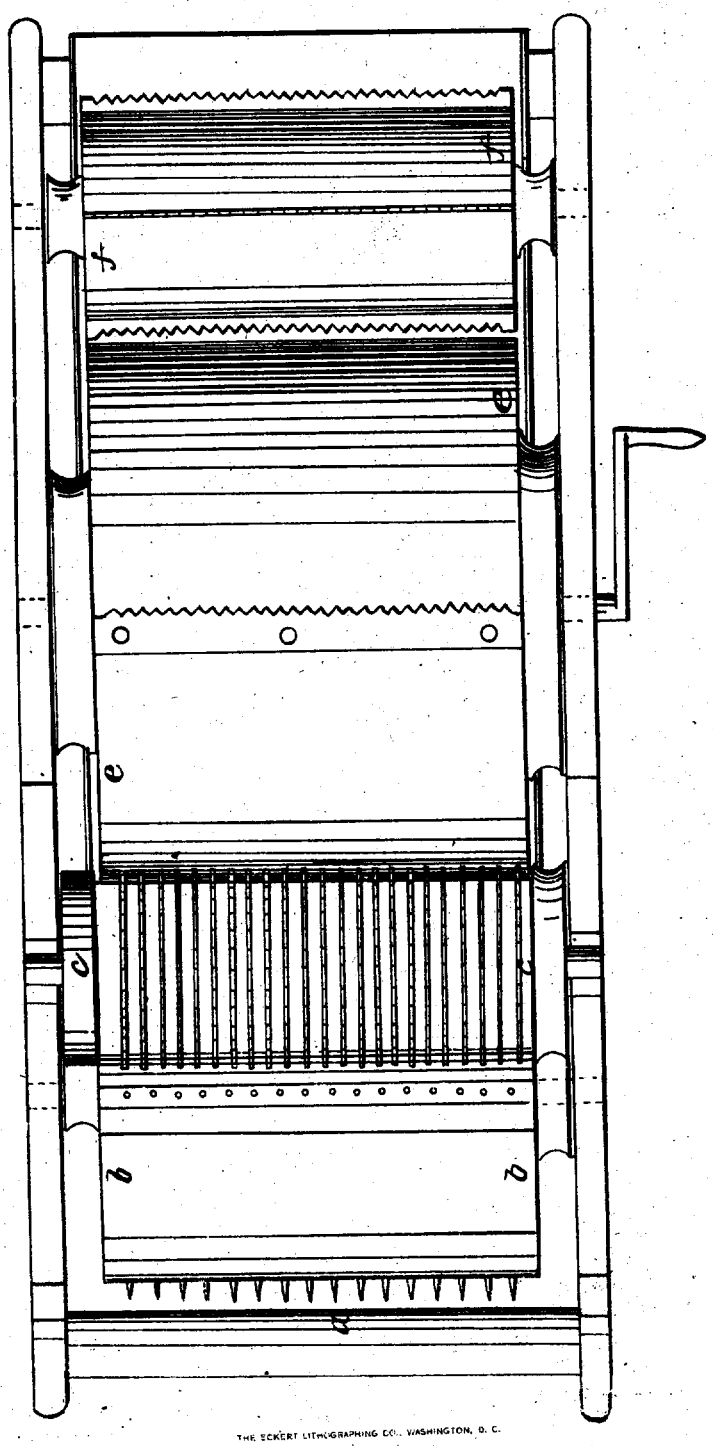
THE ECKERT LITHOGRAPHING CO., WASHINGTON, D. C.

Sheet 2, 2 Sheets.
F. A. Calvert.
Wool & Cotton Picker.
No. 59. Reissued Dec. 27, 1843
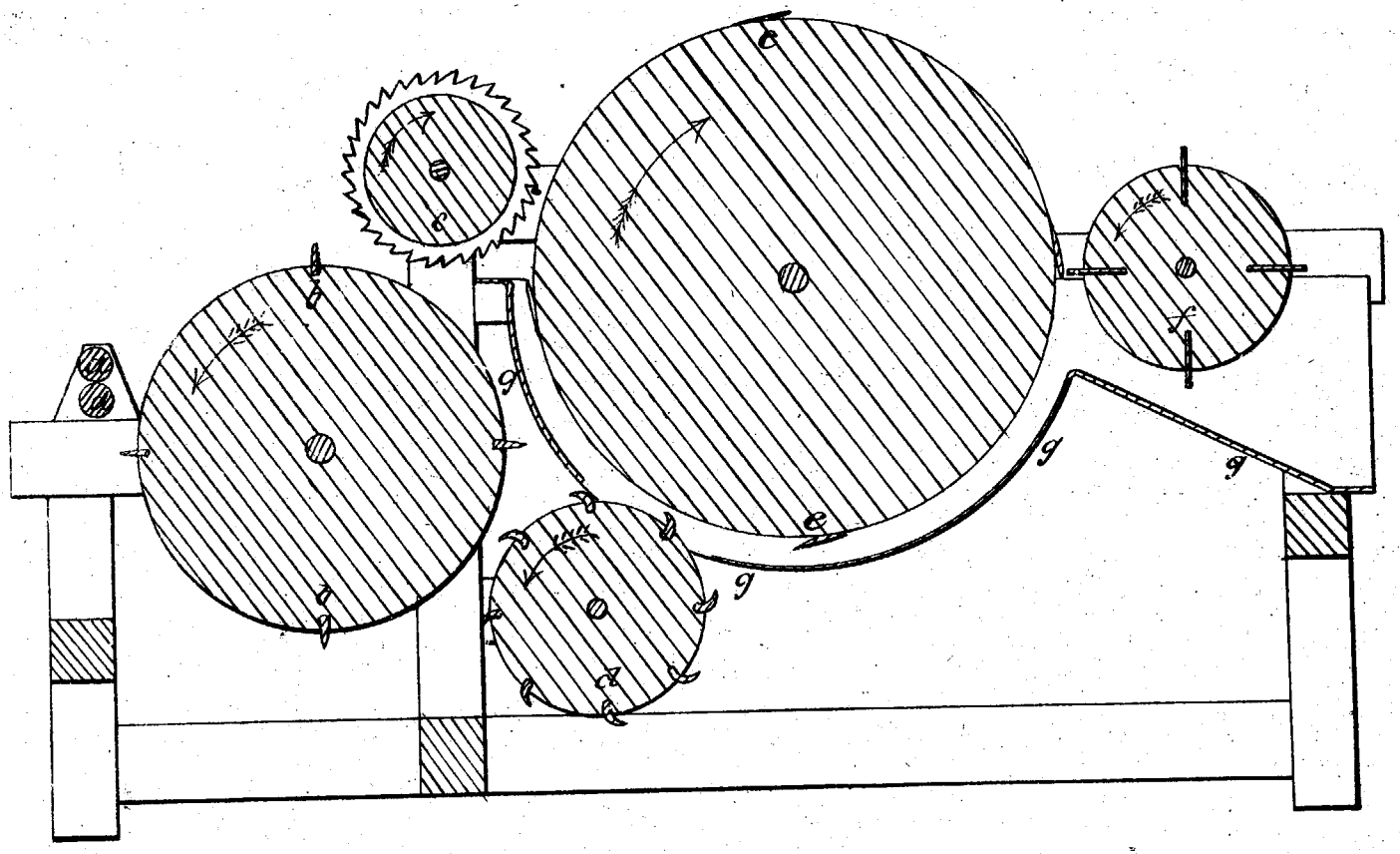
THE ECKERT LITHOGRAPHING CO., WASHINGTON, D. C.

UNITED STATES PATENT OFFICE.

FRANCIS A. CALVERT, OF PATERSON, NEW JERSEY.

IMPROVEMENT IN MACHINES FOR PICKING WOOL AND SEPARATING BURRS AND OTHER FOREIGN MATTER THEREFROM, ALSO APPLICABLE TO GINNING COTTON.

Specification forming part of Letters Patent No. 3,120, dated June 3, 1843; Reissue No. 59, dated December 27, 1843.

*To all whom it may concern:*

Be it known that I, FRANCIS A. CALVERT, formerly of the city of New York, but now of Paterson, in the State of New Jersey, have invented a new and useful machine for the purpose of separating burrs and other foreign matters from wool, and which machine may be applied also to the ginning or separating of the seeds from cotton; and I do hereby declare that the following is a full and exact description of my said machine.

In the accompanying drawings, Figure 1 is a top view of my improved machine, and Fig. 2 a vertical section there from front to back, through the middle.

At *a a* are shown the ordinary feed-rollers, which, by the aid of an endless apron, carry the wool or cotton to the cleaning or ginning apparatus. The feeding-apron is not shown, as it does not differ from those in general use. From the feeding-apron the material passes onto the picker-cylinder *b b*.

*c c* is what I denominate the "toothed" or "saw" cylinder, which I form in the following manner: I take the required number of circular saws of the proper diameter, and these I place upon a shaft, interposing disks of wood or other substance of about an eighth of an inch in thickness between them, thus forming a cylinder of saws somewhat similar to that used in the saw-gin for ginning cotton, but with the saw-plates much nearer to each other. This cylinder and that marked *d*, which I call the "receiver," constitute the most novel features of my improved machine, and render it superior in action to any of those heretofore employed for a like purpose. The teeth of the receiver are hooked, and they may consist of strong card-teeth. The fine-comb cylinder is marked *e e*, and is the same in its construction and operation with that known under that name and previously in use. *f f* is the fan or cleaning cylinder. This and the picker-cylinder *b* are also similar in construction and operation to those employed in other wool-cleaning machines.

In using this machine the cylinders are made to revolve in the direction indicated by the arrows. For a machine of ordinary size the picker-cylinder may be about eighteen inches in diameter, the receiver about twelve inches, the fine-toothed cylinder about two feet, the toothed or saw cylinder about six inches, the fan about twelve inches. The respective cylinders may be driven by bands and whirls in the ordinary manner, and their relative velocities should be nearly as follows: The fine-comb cylinder may have from three hundred to three hundred and twenty-five revolutions in a minute. The picker-cylinder may perform two revolutions on its axis to one of the fine-comb cylinders. The receiver may make one revolution on its axis to two of the fine-comb cylinder, and the same may be the case with the toothed or saw cylinder. The fan may revolve four times to each revolution of the fine-comb cylinder. Should the relative diameters of any of the cylinders be changed materially their angular velocities should be varied in a corresponding degree, for, although it is not necessary that their peripheries should revolve with velocities precisely the same with those above pointed out, the proper action of the machine will, in a great degree, depend upon the relative speed of the respective operating-surfaces.

When this machine is in action, the wool or cotton is, as above stated, taken from the feed-rollers by the picker-cylinder, as heretofore. From this it is taken by the teeth of the cylinder which I have called the "receiver." From these teeth it is delivered onto the fine-comb cylinder, upon the teeth of which it is spread much more evenly by the receiver than has been attained under any arrangement of the cleaning or ginning cylinders heretofore adopted. There may, if preferred, be two or more receivers placed one above the other, each of them revolving in the same direction, and performing a like office. The wool or cotton may, in this case, be spread thinner upon each of them, and the work be still performed with equal rapidity. With some kinds of wool such increase in the number of receivers will be found particularly advantageous. The teeth of the saw-cylinder take the burrs, seeds, or other foreign matter from the wool or cotton which is spread upon the fine-comb cylinder.

As represented in the drawings, the picker-cylinder is sufficiently near to the saw-cylinder to beat from it any burrs or other refuse matter which might otherwise accumulate upon and choke it. By a variation in the position of the respective cylinders the receiver may be made to perform the same office, and the proper action of the machine requires that one or other of them should be so employed. A casing of sheet metal, *g g*, or of some other substance, extends under the fine-comb cylinder; but this has an opening through it which admits of the action of the receiver on said fine-comb cylinder. This casing prevents any portion of the burrs, &c., from being carried back to the point of contact between these two cylinders. The action of the fan is the same as in other machines for a like purpose.

Having thus fully described the manner in which I construct my improved burring, cleaning, and ginning machine, and shown the manner in which the same operates, what I claim therein as new, and desire to secure by Letters Patent, is—

1. The combining of a cylinder such as I have denominated the "toothed" or "saw" cylinder with the fine-comb cylinder of a burring, cleaning, or ginning machine, in the manner and for the purpose above set forth. I do not claim the constructing of such a cylinder as new in itself, but only as constituting in its combination a new and important feature in my cleaning-machine. In all the machines heretofore employed for the burring and cleaning of wool much of the fiber has been broken by the action of the instruments employed in the separation of the foreign matter therefrom. This loss and inconvenience are completely obviated by means of the above-claimed combination of the toothed or saw cylinder with the fine-comb cylinder.

2. The combining of one or more cylinders, such I have denominated "receivers," with the picker and fine-comb cylinders, so as to operate between them, in the manner and for the purpose herein made known.

FRANCIS A. CALVERT.

Witnesses:
JOHN P. ROBINSON,
HORATIO G. CORLISS.